United States Patent
Dries et al.

(10) Patent No.: US 8,241,583 B2
(45) Date of Patent: Aug. 14, 2012

(54) PROCESS FOR CRACKING A HYDROCARBON FEED

(75) Inventors: Hubertus Wilhelmus Albertus Dries, Amsterdam (NL); Rene Samson, Amsterdam (NL)

(73) Assignee: Shell Oil Company, Houston, TX (US)

(*) Notice: Subject to any disclaimer, the term of this patent is extended or adjusted under 35 U.S.C. 154(b) by 152 days.

(21) Appl. No.: 12/920,596

(22) PCT Filed: Mar. 5, 2009

(86) PCT No.: PCT/EP2009/052640
§ 371 (c)(1),
(2), (4) Date: Nov. 15, 2010

(87) PCT Pub. No.: WO2009/109644
PCT Pub. Date: Sep. 11, 2009

(65) Prior Publication Data
US 2011/0058992 A1  Mar. 10, 2011

(30) Foreign Application Priority Data
Mar. 7, 2008  (EP) .................................. 08102366

(51) Int. Cl.
*B01J 8/08* (2006.01)
*B01J 19/00* (2006.01)
*B01J 8/18* (2006.01)
*B01J 8/02* (2006.01)
*B01J 35/02* (2006.01)
*F27B 15/00* (2006.01)

(52) U.S. Cl. ........ 422/219; 422/129; 422/139; 422/141; 422/143; 422/211; 422/232

(58) Field of Classification Search ............ 422/129, 422/139, 141, 143, 211, 219, 232
See application file for complete search history.

(56) References Cited

U.S. PATENT DOCUMENTS

| | | | | |
|---|---|---|---|---|
| 2,631,927 | A * | 3/1953 | Trainer et al. | 422/144 |
| 3,130,007 | A | 4/1964 | Breck | 23/113 |
| 3,861,058 | A | 1/1975 | Whelan | 34/57 |
| 3,928,172 | A | 12/1975 | Davis, Jr. et al. | 208/77 |
| 4,147,657 | A * | 4/1979 | Kovanda et al. | 516/79 |
| 4,274,941 | A | 6/1981 | Janssen et al. | 208/8 |
| 4,624,058 | A * | 11/1986 | Nakayasu et al. | 34/360 |
| 5,242,662 | A * | 9/1993 | Toth | 422/142 |
| 6,869,521 | B2 | 3/2005 | Lomas | 208/67 |

FOREIGN PATENT DOCUMENTS

| | | |
|---|---|---|
| GB | 1562571 | 3/1980 |
| WO | WO8705687 | 9/1987 |
| WO | WO9932217 | 7/1999 |
| WO | WO2006020547 | 2/2006 |

* cited by examiner

*Primary Examiner* — Walter D Griffin
*Assistant Examiner* — Natasha Young
(74) *Attorney, Agent, or Firm* — Charles W. Stewart

(57) ABSTRACT

A process for cracking a hydrocarbon feed in a reactor assembly comprising: a reactor vessel; a solid catalyst inlet by which catalyst is introduced and a solid catalyst outlet by which catalyst is removed from the reactor vessel; a plurality of feed nozzles by which feed is introduced at the bottom of the vessel; a product outlet for removing a product mixture of gas and solid catalyst at the upper part of the reactor; at least one partition plate, that divides the interior of the reactor vessel into two or more compartments, wherein the partition plate intersects the solid catalyst inlet.

16 Claims, 1 Drawing Sheet

PROCESS FOR CRACKING A
HYDROCARBON FEED

The present application claims priority from European Patent Application 08102366.5 filed Mar. 7, 2008.

The invention relates to a process for cracking a hydrocarbon feed in a reactor assembly, preferably a process for cracking a hydrocarbon feed into lower olefins.

The fluidised catalytic cracking (FCC) of heavy hydrocarbons to produce lower boiling hydrocarbon products such as gasoline is well known in the art. Typically, an FCC unit includes a riser reactor, a catalyst separator and stripper, and a regenerator. An FCC feedstock is introduced into the riser reactor wherein it is contacted with hot FCC catalyst from the regenerator. During the contact the mixture of the feedstock and FCC catalyst passes through the riser reactor producing vaporous cracked product and coke that deposits on the catalyst, forming spent catalyst. The mixture is passed into a catalyst separator wherein the cracked product is separated from the spent catalyst. The separated cracked product passes from the catalyst separator to a downstream fractionation system and the separated spent catalyst passes to the stripper, where hydrocarbon products are stripped from the catalyst particles by means of a stripping medium. From there, the spent catalyst is passed to the regenerator where the coke is burned off the spent catalyst to provide a hot regenerated catalyst. The resulting regenerated catalyst is used as the aforementioned hot FCC catalyst and is mixed with the FCC feedstock that is introduced into the riser reactor.

Many FCC processes are designed to provide for a high conversion of the FCC feedstock to products boiling in the gasoline or middle distillate range. There are also FCC systems that provide for the simultaneous manufacture of two different hydrocarbon products using two reactors, whilst employing the same catalyst. Such a system is described in for example WO-A-2006/020547 and in U.S. Pat. No. 3,928,172.

WO-A-2006/020547 describes a system wherein in an FCC riser reactor a gasoil is cracked, and wherein in a fluidised bed reactor a gasoline feedstock is cracked to lower olefins such as propylene. The two reactors use one regenerator, and a portion of the catalyst used in the dense bed reactor is used as hot FCC catalyst in the riser reactor. Benefits of such use include using a partially deactivated, relatively cold FCC catalyst in the riser reactor. This is especially beneficial when middle distillates are preferred as the products of the FCC riser reactor.

It has now been found that the design of the fluidised bed reactor can be improved.

Accordingly, the present invention provides a process for cracking a hydrocarbon feed in a reactor assembly comprising a reactor vessel; a solid catalyst inlet by which catalyst is introduced and a solid catalyst outlet by which catalyst is removed from the reactor vessel; a plurality of feed nozzles by which feed is introduced at the bottom of the vessel; a product outlet for removing a product mixture of gas and solid catalyst at the upper part of the reactor vessel; and at least one partition plate, that divides the interior of the reactor vessel into two or more compartments, wherein the partition plate intersects the solid catalyst inlet.

By dividing the interior of the reactor vessel into at least two compartments, more flexibility is created in operating conditions in the reactor vessel. The partition plate in the solid catalyst inlet makes that a single catalyst inlet is in direct fluid communication with different compartments. This allows different compartments to be supplied with catalyst in a simple and efficient but well regulated manner. The process conditions applied in one compartment may be very different from the ones applied in the other compartment. For example, the supply of feed may be different in the different compartments and the amount of solid catalyst per compartment may be different. Also the temperature may differ between the compartments, the residence time of the catalyst and the catalyst to hydrocarbon feedstock ratios. By varying the process conditions in the different compartments, one has the flexibility to optimise the reactions in the different compartments independently.

Preferably, the compartments have a common product outlet. A single product outlet makes that efficient use is being made of utilities which the compartments have in common while still being flexible in the operation of the compartments.

The fluidised bed may be in the so-called bubbling bed mode. In this mode fluidising vapour forms bubbles that ascend through a catalyst bed. This mode has been described in, e.g., U.S. Pat. No. 6,869,521. This mode of fluidisation occurs at relatively low superficial gas velocities. At higher values of the superficial gas velocity, the existence of discrete bubbles becomes questionable and one then speaks about turbulent beds and fast fluidising beds. In these regimes the mixing of the solid phase and the mass transfer between the gas and the solid phase is more intense than in bubbling beds, which may result in better yield selectivities. The current invention makes it possible to cover all three dense-phase fluidised bed regimes (bubbling, turbulent and fast-fluidized). If certain products are desired, for instance more gasoline or more middle distillates, the process conditions can be very easily adapted, without the need for a different reactor assembly.

The invention shall be further elucidated by means of the following figures.

Figure 1:
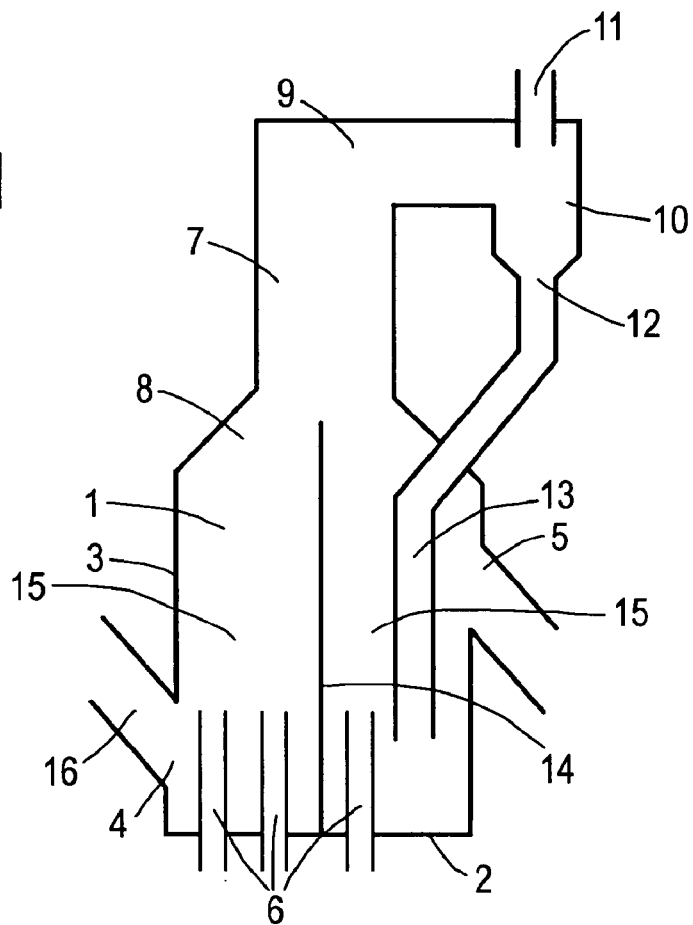
FIG. 1 represents a reactor assembly in elevation view.

The partition plates between the different compartments are preferably arranged substantially perpendicular to the bottom of the reactor vessel. With substantially perpendicular is meant that the partition plate makes an angle with the bottom of the vessel in the range from 80° to 100°, more preferably in the range from 85 to 95°, even more preferably in the range from 88 to 92°. Most preferred is that the partition plate is perpendicular to the bottom of the reactor vessel, with an angle of about 90° between the plate and the bottom of the vessel. Preferably, the partition plates extend to above the level of the solid catalyst outlet.

The height of the partition plates depends on the size of the reactor. Preferably, the partition plates have a height ranging from 1 to 15 m, more preferably from 2 to 7 meters.

The reactor assembly preferably further comprises a standpipe that is connected to the solid catalyst inlet of the reactor vessel. Preferably, the standpipe is arranged at the solid catalyst inlet such that the axis of the standpipe makes a sharp angle with the axis of the reactor vessel. The sharp angle is defined as the angle between the axis of the standpipe and the axis of the reactor vessel, being any angle smaller than 60°.

Solid catalyst is transported through the standpipe, optionally from a fluid catalytic cracking regenerator. Preferably, the standpipe is provided with a pipe-partition plate inside the standpipe that forms an extension of the partition plate that intersects the solid catalyst inlet. This pipe-partition plate divides the solid catalyst into two parts upon entering the reactor vessel. Preferably, the standpipe is provided with at least one slide valve. More preferably, the standpipe is provided with two slide valves, one at each side of the pipe-partition plate. These slide valves might be advantageously used to regulate the amount of solid catalyst entering the reactor vessel at one or both sides of the pipe-partition plates. Another possibility to regulate the amount of catalyst at each side of the partition plates is the location of the pipe-partition plate. If it is placed exactly in the middle of the standpipe and solids inlet, at both sides of the partition plate about the same amount of catalyst will enter the reactor vessel. But if it is placed outside the middle of the standpipe, one side will receive more solid catalyst than the other side. The preferred option to adjust the amount of catalyst entering the compartments of the reactor vessel is to use one or more slide valves in the standpipe, because this gives more flexibility and controllability.

Solid catalyst leaves the reactor vessel via the solids outlet. Preferably, the solids outlet is fluidly connected to a standpipe. The flow through this standpipe may be regulated by a slide valve. By regulating the flow through the standpipe it is possible to maintain a bed of solid catalyst at a certain level in the reactor vessel.

In a preferred embodiment of the current invention, the partition plate intersecting the solid catalyst inlet extends to the bottom of the reactor vessel. This results in that the communication between compartments is reduced in the lower part of the reactor vessel, but is still possible in the upper part of the vessel. If more than one partition plate is present, these plates can also extend to the bottom of the reactor vessel. It is also possible that one or more plates do not extend to the bottom of the reactor vessel, creating an opening at the bottom side of such a plate. Via this opening solid catalyst may fluidly move from one side to the other side of the partition plate. Solid catalyst moves then from one compartment to the other compartment. Another possibility is that the partition plate extends to the bottom of the reactor vessel, provided with orifices close to the bottom of the reactor. The orifices may have for example a circular shape or a rectangular. The size of the orifices is such that a flow of solid catalyst between the compartments is easily reached.

When the reactor vessel is used for cracking hydrocarbon feedstock, the resulting product mixture can be transported together with the catalyst to a subsequent reactor. It is however preferred to separate the product mixture from the catalyst before entering a next reaction zone, preferably a riser reactor. The advantage of this separate separation step is that the normally gaseous product mixture is not subjected to further reaction in the second reactor which would have a deleterious effect on the product selectivities. Therefore, the reactor assembly preferably comprises a conduit for transporting the product mixture from the product outlet to a gas-solids separator, which is used to separate the product mixture into gas that is removed via a gas outlet in the upper part of the separator, and solid catalyst, that is discharged via a solids outlet provided in the lower part of the separator.

In the reactor vessel of the present invention, one or more of the compartments may be used to bypass solid catalyst, and one or more compartments are used to bring the solid catalyst in contact with feed in order to crack the feed. Preferably, one compartment encompasses both at least part of the solid catalyst inlet and at least part of the solid catalyst outlet. This compartment may be defined as the by-pass compartment. Preferably, this by-pass compartment contains injection nozzles connected to an inert vapour supply. If there is a common product outlet for the compartments, the by-pass compartment does not need to be in fluid communication with it as substantially no product will be formed there. Preferably, the number of compartments in the reactor vessel amounts from 2 to 6, more preferably from 2 to 4. The inert vapour supply can be any vapour that does not take part in the reaction, such as nitrogen, carbon dioxide, steam, or a noble gas. Preferably, the inert vapour is steam.

The operating conditions of the process of the present invention preferably comprise a temperature of from 550 to 675° C., preferably from 580 to 620° C., a catalyst to feed ratio of from 5 to 100, preferably from 6 to 20, a superficial gas velocity of from 0.3 to 15 m/s, preferably from 0.6 to 10 m/s, and/or a vapour residence time of from 0.5 to 20 s, preferably from 1 to 10 s. Further, the catalyst residence time preferably is of from 1 to 300 s, more preferably from 2 to 60 s. These process conditions preferably are present in at least the compartment in which the catalyst is first contacted with feed, more preferably in each of the compartments other than any by-pass compartment as defined herein. The operating conditions preferably are such that the hydrocarbon feed is converted to olefins, more specifically into ethene and/or propene.

In a preferred embodiment of the present invention, the gas-solids separator comprises a dipleg for transferring solid catalyst from the separator solids outlet to the reactor vessel. This results in, when in use, a recycle of the solid catalyst back into the reactor vessel. When applied in FCC, the solid catalyst that is transferred via the separator has a lower temperature than the catalyst that enters the reactor vessel for the first time due to the endothermic cracking reactions that occurred in the reactor vessel. Preferably, the dipleg has such a length, that the end of the dipleg is lower than the top of one of the partition plates and that it ends in a specific compartment of the reactor vessel, namely the by-pass compartment. When separated solid catalyst re-enters the reactor vessel, it will mix with the catalyst that is present in the vessel, and the average temperature of the catalyst will be reduced before entering the solid catalyst outlet. In the preferred embodiment, the solid catalyst enters the reactor vessel for the first time at a high initial temperature. In the compartment(s) where a reaction takes place, the catalyst will reduce in temperature. The catalyst is separated from the reaction products and recycled to the bypass compartment, where the catalyst freshly entered into the reactor vessel and having a high temperature mixes with the cooler used catalyst. The advantage of this is that the higher temperature of the fresh catalyst is preferred to crack the products in the reactor, while a lower catalyst temperature might be useful in a next cracking step.

The size of the reactor vessel of the present invention can be determined by the skilled person and depends on the use of the reactor, and the space available. When a reactor assembly is part of a bigger plant that needs to be built from the start the size of the reactor vessel is less strictly limited than when the reactor assembly is built in an already existing plant, as part of a revamp of the plant. Preferably, the cross-sectional diameter of the reactor vessel amounts from 1 to 10 m, more preferably from 2 to 6 m.

The reactor assembly as described above is used as a fluidized bed reactor. Different fluidizing modes have been described in, e.g., U.S. Pat. No. 6,869,521. The fluidised bed may be in the so-called bubbling bed mode. In this mode fluidising vapour forms bubbles that ascend through a catalyst bed. Other fluidizing beds are known as turbulent beds and fast fluidising bed regimes. Such regimes are preferred. Therefore, it is advantageous that the hydrocarbon feed is contacted with catalyst at catalyst to feed ratio of 5 to 100, a superficial gas velocity of 0.3 to 15 m/s and a vapour residence time of 0.5 to 20 s. Such regimes ensure that the residence time for the feed is sufficiently long to enable a thorough cracking to desired olefinic products. It may be advantageous to supply steam to the reactor, either mixed with the hydrocarbon feedstock or separately. This steam could either serve as a fluidising medium, to keep the catalyst well fluidised or it could have a function in optimising the yield pattern in the chemical reactions, to arrive for example at the optimal catalyst to oil ratio, or to the most optimal residence time. The amount of steam, or any other inert vapour, may vary within wide ranges. It has been found that excellent lower olefin yields, preferably propylene yields, are obtainable when the amount of steam does not exceed 50% wt, preferably not exceeding 25% wt, based on the weight of the steam and the hydrocarbon feedstock.

Preferably, the reactor assembly is used in series with a riser reactor. With 'in series' is to be understood that catalyst flows first from the regenerator to the reactor assembly and then to the riser reactor. The most preferred configuration of the reactor assembly in this case has one by-pass compartment and at least 1, but preferably 3 reactor compartments. In such a configuration, holes in the bottom of partition plates that separate different reactor compartments enable the catalyst to flow freely from one reactor compartment to another.

The use of the most preferred reactor vessel is then the following: regenerated cracking catalyst, having a temperature preferably in the range from 600 to 750° C., more preferably in the range from 650 to 725° C., even more preferably in the range from 680 to 700° C., enters the reactor vessel via the standpipe. The catalyst is split up in at least two streams, one entering the by-pass compartment, and one entering one of the other compartments. In the by-pass compartment, preferably steam is supplied via one or more nozzles at the bottom of the vessel present in the by-pass compartment. The function of the steam is that the catalyst remains in a fluidized state. In one or more of the other compartments, besides preferably steam, also a hydrocarbon feedstock is entered via one or more feed nozzles present at the bottom of the vessel. If for example naphtha is used as hydrocarbon feed, the hot temperature of the catalyst will result in high yields of lower olefins, being preferably C3 and C4 olefins, more preferably propylene, and good selectivity, with relatively low dry-gas make and low coke make. Because of the reaction, the catalyst cools down about 50 to 150° C., and is henceforth referred to as used catalyst. The used catalyst may have some coke left on the surface of the catalyst. The gaseous products formed leave the reactor vessel via the top of the reactor. This gas stream may entrain part of the used catalyst. The used catalyst is separated from the products via the solids separator, connected to the top of the reactor vessel. The product leaves the reactor assembly via the products outlet and the used catalyst re-enters the reactor vessel via the dipleg. A second route for used catalyst to enter the bypass compartment is to flow through the bottom holes in the partition plates between some of the other compartments and the bypass compartment. In this preferred embodiment, the used catalyst enters the by-pass compartment, filled with the regenerated catalyst. The used catalyst mixes in the by-pass compartment with the regenerated catalyst to form a mixture of used and regenerated catalyst. This catalyst mixture has a lower temperature than the regenerated catalyst, preferably at least 10° C. lower, more preferably at least 20° C. lower, even more preferably at least 25° C. lower. The temperature of the mixture is preferably in the range from 500 to 700° C., more preferably in the range 600 to 700° C., even more preferably in the range from 630 to 670° C. The catalyst mixture is transported to the riser reactor to crack a second hydrocarbon feedstock to form middle distillates. It is advantageous to mix the catalyst before entering the riser, because of the resulting homogeneous temperature distribution over the riser reactor. The homogeneous temperature distribution is advantageous for the product selectivity of the cracking reaction. One beneficial aspect of such a process is partial deactivation by the deposition of small amounts of coke, as explained in WO-A 2006/020547. Thereby the cracking process is less severe, which benefits the production of middle distillates. Middle distillates are hydrocarbons with a boiling range from about 200° C. to 370° C.

The hydrocarbon feed to the reactor vessel of the present invention is preferably a gasoline feedstock. More preferably, the hydrocarbon feedstock consists of hydrocarbons with a boiling point from 32 to 250° C.

The mixture of freshly regenerated catalyst and used catalyst which can be prepared in the present invention is especially suitable for use in a further fluidized catalytic cracking reactor where a heavy hydrocarbon feedstock is cracked in a riser reactor to produce middle distillates. The hydrocarbon feedstock to the riser is preferably chosen from gasoils and heavier feeds. Preferably, this feedstock is a vacuum gas oil. More preferably, the hydrocarbon feedstock to the riser reactor consists of hydrocarbons that have a boiling range from 345 to 760° C. For this feedstock it will be relatively easy to vaporise under FCC conditions, whereas the cracking process gives optimal yield of valuable products such as gasoline and middle distillates. The cracking conditions may be selected from a wide range as is known to the skilled artisan. Suitably the hydrocarbon feedstock for the riser is catalytically cracked at a temperature of 480 to 560° C. and a catalyst to oil ratio of 4 to 12.

Preferred catalytic cracking catalysts for use in the present invention include fluidisable cracking catalysts comprised of a molecular sieve having cracking activity dispersed in a porous, inorganic refractory oxide matrix or binder. The term "molecular sieve" as used herein refers to any material capable of separating atoms or molecules based on their respective dimensions.

Molecular sieves suitable for use as a component of the cracking catalyst include pillared clays, delaminated clays, and crystalline aluminosilicates. Normally, it is preferred to use a cracking catalyst that contains a crystalline aluminosilicate. Examples of such aluminosilicates include faujasites, such as zeolite Y, ultrastable zeolite Y and zeolite X, zeolite beta, zeolite L, offretite, mordenite and zeolite omega. The preferred crystalline aluminosilicates for use in the cracking catalyst are zeolite X and Y, with zeolite Y being the most preferred.

U.S. Pat. No. 3,130,007 describes Y-type zeolites having an overall silica-to-alumina mole ratio between about 3.0 and about 6.0, with a typical Y zeolite having an overall silica-to-alumina mole ratio of about 5.0. It is also known that Y-type zeolites can be produced, normally by dealumination, having an overall silica-to-alumina mole ratio above about 6.0. Thus, for purposes of this invention, a zeolite Y is one having the characteristic crystal structure of a zeolite Y, as indicated by the essential X-ray powder diffraction pattern of zeolite Y.

The stability and/or acidity of a zeolite used as a component of the cracking catalyst may be increased by exchanging the zeolite with hydrogen ions, ammonium ions, polyvalent metal cations, such as rare earth-containing cations, magnesium cations or calcium cations, or a combination of hydrogen ions, ammonium ions and polyvalent metal cations, thereby lowering the sodium content until it is less than about 0.8 weight percent, preferably less than about 0.5 weight percent and most preferably less than about 0.3 weight percent, calculated as $Na_2O$. Methods of carrying out the ion exchange are well known in the art.

The zeolite or other molecular sieve component of the cracking catalyst is combined with a porous, inorganic refractory oxide matrix or binder to form a finished catalyst prior to use. The refractory oxide component in the finished catalyst may suitably be silica-alumina, silica, alumina, natural or synthetic clays, pillared or delaminated clays, mixtures of one or more of these components and the like. Preferably, the inorganic refractory oxide matrix will comprise a mixture of silica-alumina and clay such as kaolin, hectorite, bentonite, sepiolite and attapulgite. A preferred finished catalyst will typically contain from 5 wt % to 40 wt % zeolite or other molecular sieve and at least 20 wt % inorganic, refractory oxide, based on total catalyst. In general, the finished catalyst may contain from 10 to 35 wt % zeolite or other molecular sieve, from 10 to 30 wt % inorganic, refractory oxide, and from 30 to 70 wt % clay, based on the weight of these zeolite or molecular sieve, inorganic refractory oxide and clay.

The crystalline aluminosilicate or other molecular sieve component of the cracking catalyst may be combined with the porous, inorganic refractory oxide component or a precursor thereof by any suitable technique known in the art including mixing, mulling, blending or homogenization. Examples of precursors that may be used include alumina, alumina sols, silica sols, zirconia, alumina hydrogels, polyoxycations of aluminum and zirconium, and peptized alumina. Normally, the finished catalyst will have an average bulk density from 0.30 to 0.90 kg/dm3 and a pore volume from 0.10 to 0.90 ml/g.

Another method by which the process yields can be beneficially influenced is to use a catalyst that comprises a combination of two zeolites. The preferred combination is a zeolite from the family of large pore zeolites and a member from the medium pore zeolites.

Suitable zeolites include medium pore zeolites as described in "Atlas of Zeolite Structure Types," eds. W. H. Meier and D. H. Olson, Butterworth-Heineman, Third Edition, 1992. The medium pore size zeolites generally have a pore size from about 0.5 nm, to about 0.7 nm and include, for example, MFI, MFS, MEL, MTW, EUO, MTT, HEU, FER, and TON structure type zeolites (IUPAC Commission of Zeolite Nomenclature). Non-limiting examples of such medium pore size zeolites, include ZSM-5, ZSM-12, ZSM-22, ZSM-23, ZSM-34, ZSM-35, ZSM-38, ZSM-48, ZSM-50, silicalite, and silicalite 2. The most preferred is ZSM-5 Other suitable molecular sieves include the silica-aluminophosphates (SAPO), chromosilicates, gallium silicates, iron silicates; aluminum phosphates (ALPO), titanium aluminosilicates (TASO), boron silicates, titanium aluminophosphates (TAPO) and iron alumino-silicates. Most preferred is a combination of zeolite Y and ZSM-5.

The invention shall be further elucidated by means of the following non-limiting figures.

FIG. 1 shows a reactor assembly in elevation view. The reactor assembly as shown in FIG. 1 is a preferred embodiment, comprising a reactor vessel (1) with a bottom (2) and a reactor wall (3), a solid catalyst inlet (4) and a solid catalyst outlet (5) in the reactor wall (3); a plurality of feed nozzles (6) at the bottom of the vessel (2); a product outlet (7) for a product mixture of gas and solid catalyst at the upper part (8) of the reactor; a conduit (9) for transporting the product mixture from the product outlet (7) to a gas-solids separator (10); a gas outlet (11) in the upper part of the separator (10), a solids outlet (12) provided in the lower part of the separator (10) and a dipleg (13); two partition plates (14), of which only one is clearly visible in this view in the figure, that divide the interior of the reactor vessel into four compartments (15). A standpipe (16) is connected to the solids inlet (4).

Figure 2:
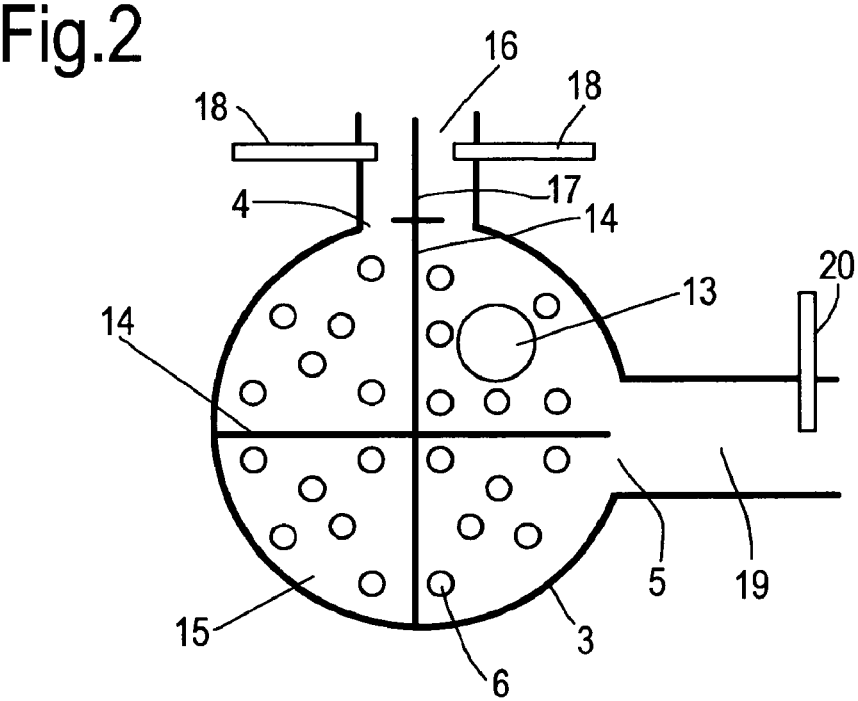
FIG. 2 represents the reactor assembly in top view.

FIG. 2 shows the preferred reactor assembly in top view. In top view it is clearly visible that the partition plate (14) intersects the solid catalyst inlet (4) and that in this embodiment two partition plates (14) are present. The standpipe (16) is further provided with a pipe-partition plate (17) inside the standpipe (16) that forms an extension of the partition plate (14) that intersects the solid catalyst inlet (4). The standpipe (16) is provided with slide valves (18), one at each side of the pipe-partition plate (17). The conduit (19), for transferring catalyst particles out of the reactor vessel to a next step, is preferably also provided with a slide valve (20). One of the compartments (15) encompasses at least part of the catalyst inlet (4) and at least part of the solid catalyst outlet (5). This is the so-called by-pass compartment.

What is claimed is:

1. A reactor assembly comprising:
   a reactor vessel;
   a solid catalyst inlet by which catalyst is introduced and a solid catalyst outlet by which catalyst is removed from the reactor vessel;
   a plurality of feed nozzles by which feed is introduced at the bottom of the vessel;
   a product outlet for removing a product mixture of gas and solid catalyst at the upper part of the reactor vessel; and
   at least one partition plate, that divides the interior of the reactor vessel into two or more compartments, wherein the partition plate intersects the solid catalyst inlet.

2. The reactor assembly according to claim 1, wherein the compartments have been created by partition plates that have been arranged substantially perpendicular to the bottom of the reactor vessel.

3. The reactor assembly according to claim 2, wherein the reactor assembly further comprises a conduit for transporting the product mixture from the product outlet to a gas-solids separator, which is used to separate the product mixture into gas that is removed via a gas outlet in the upper part of the separator, and solid catalyst, that is discharged via a solids outlet provided in the lower part of the separator.

4. The reactor assembly according to claim 3, wherein the gas-solids separator comprises a dipleg for transferring solid catalyst from the separator solids outlet to the reactor vessel.

5. The reactor assembly according to claim 4, wherein the partition plates extend to above the level of the solid catalyst outlet.

6. The reactor assembly according to claim 5, wherein the reactor assembly further comprises a standpipe that is connected to the solid catalyst inlet.

7. The reactor assembly according to claim 6, wherein the standpipe is provided with a pipe-partition plate inside the standpipe that forms an extension of the partition plate that intersects the solid catalyst inlet.

8. The reactor assembly according to claim 7, wherein the standpipe is provided with at least one slide valve.

9. The reactor assembly according to claim 8, wherein the standpipe is provided with two slide valves, one at each side of the pipe-partition plate.

10. The reactor assembly according to claim 9, wherein the partition plate intersecting the solid catalyst inlet extends to the bottom of the reactor vessel.

11. The reactor assembly according to claim 10, wherein the standpipe of the reactor assembly is arranged at the solid catalyst inlet such that the axis of the standpipe makes a sharp angle with the axis of the reactor vessel.

12. The reactor assembly according to claim 11, wherein one compartment encompasses at least part of the solid catalyst inlet and at least part of the solid catalyst outlet, the so-called by-pass compartment.

13. The reactor assembly according to claim 12, wherein the by-pass compartment contains injection nozzles connected to an inert vapour supply.

14. The reactor assembly according to claim 13, wherein the cross-sectional diameter of the reactor vessel amounts from 1 to 10 m.

15. The reactor assembly according to claim 14, wherein the partition plates have a height ranging from 1 to 15 m.

16. The reactor assembly according to claim 15, wherein the compartments have a common product outlet.

* * * * *